Sept. 2, 1941.    R. M. BERGSTEIN    2,254,510
METHOD OF FORMING TUBULAR STRUCTURES
Filed June 17, 1939    3 Sheets-Sheet 1
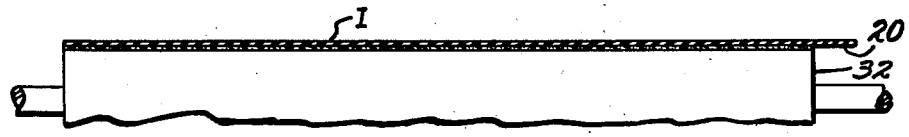
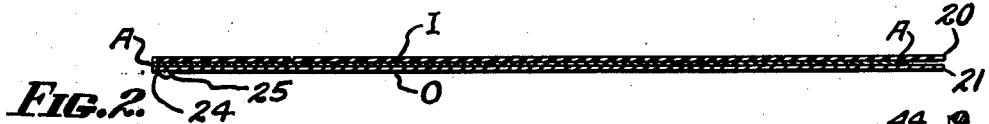
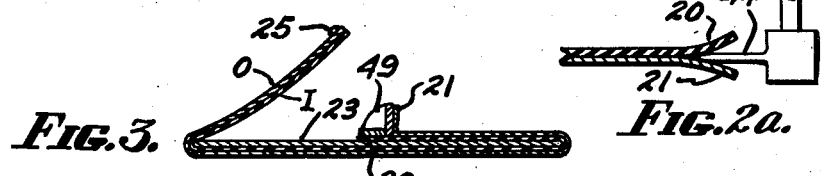
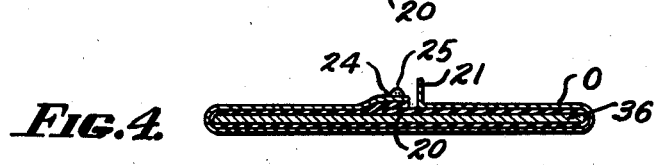
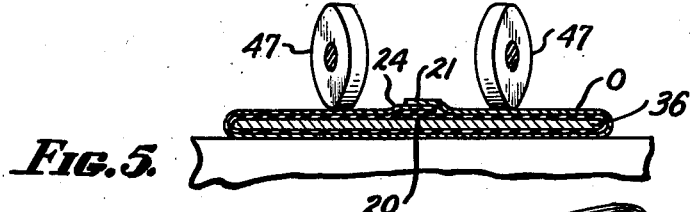
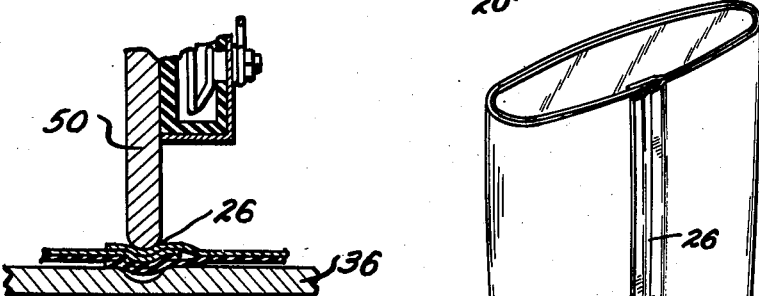
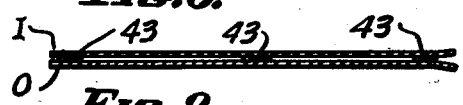
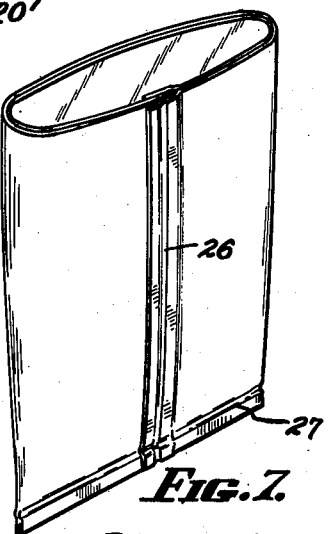
INVENTOR.
ROBERT MORRIS BERGSTEIN.
BY Allen & Allen
ATTORNEYS.

Sept. 2, 1941.   R. M. BERGSTEIN   2,254,510
METHOD OF FORMING TUBULAR STRUCTURES
Filed June 17, 1939   3 Sheets-Sheet 2
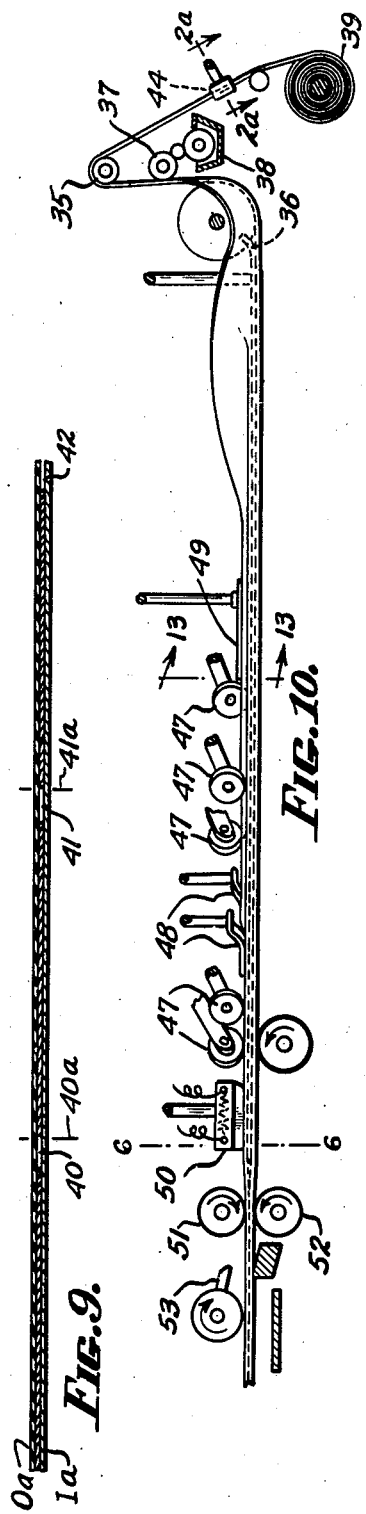
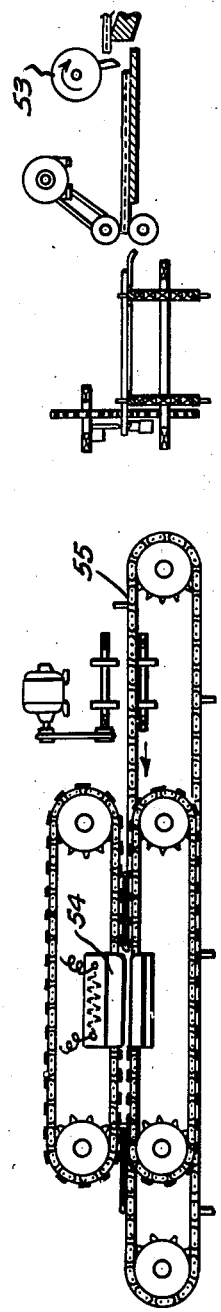
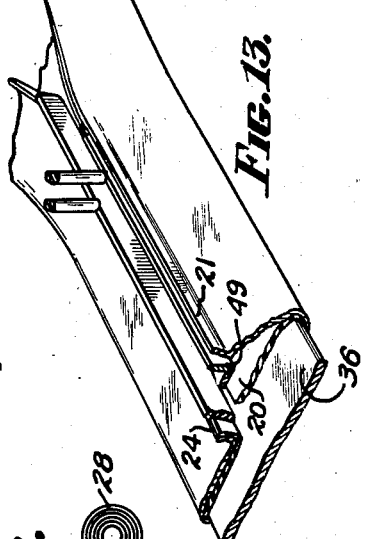
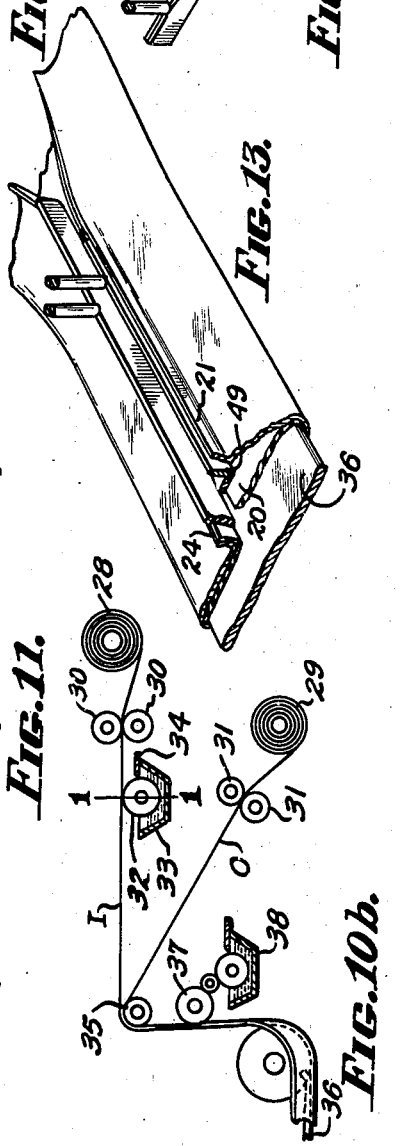
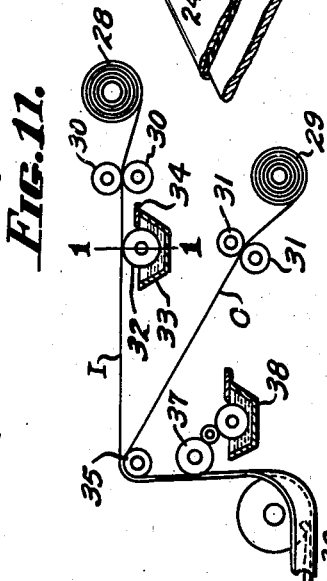
INVENTOR.
ROBERT MORRIS BERGSTEIN.
BY
Allen & Allen
ATTORNEYS.

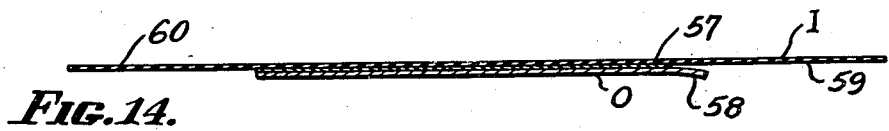
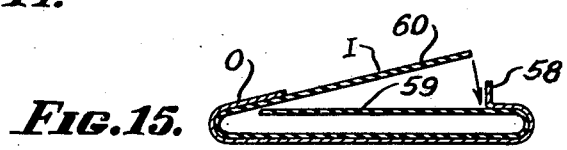
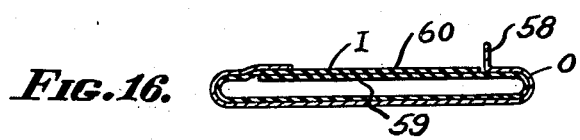
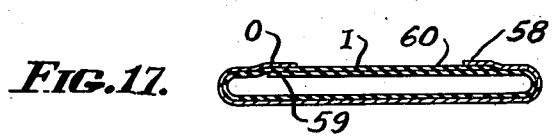
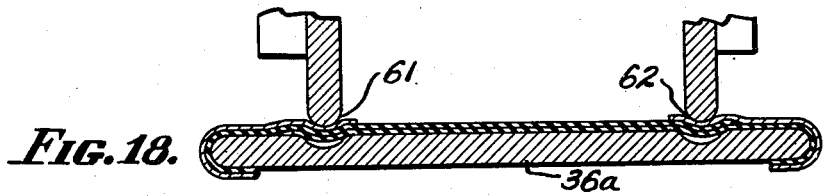
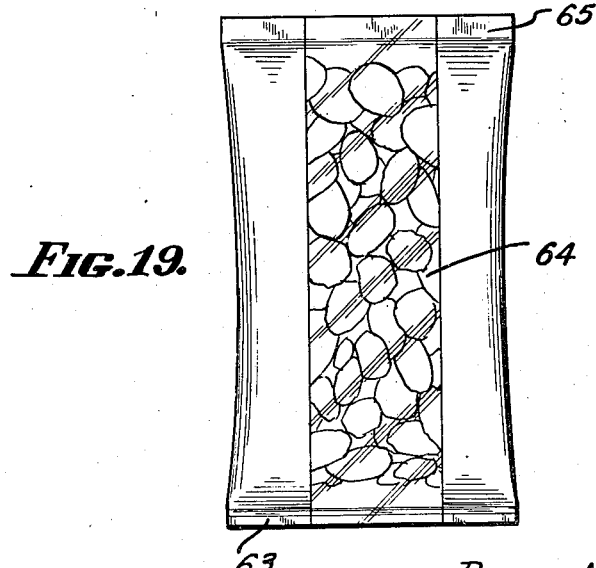

Patented Sept. 2, 1941

2,254,510

UNITED STATES PATENT OFFICE 2,254,510

METHOD OF FORMING TUBULAR STRUCTURES

Robert Morris Bergstein, Cincinnati, Ohio

Application June 17, 1939, Serial No. 279,721

5 Claims. (Cl. 93—35)

In my United States Patents No. 2,114,621 and 2,114,625 I have shown new means for producing multiple ply bags wherein the inner ply may be heat-sealable and so made as to form an interior of a unitary nature. My present invention, as disclosed herein, relates to improved methods of making such bags, whereby a multiple ply bag with an integral interior can be provided without the need of joining the plies in offset relation, and also discloses improved bag constructions, particularly in regard to multiple ply window-type bags. These and other objects of my invention will become apparent as the description proceeds.

In the drawings:

Figure 1 is a section, taken along the line 1—1 of Fig. 10b, illustrating application of adhesive to a portion of a web; this being a preliminary step in the formation of a multiple ply web.

Fig. 2 is a sectional view of the multiple ply web, the central cross-hatched portion representing the portions of the two plies which are united.

Fig. 2a is a section taken along line 2a—2a of Fig. 10.

Fig. 3 illustrates the first step in forming a tubular structure from the web of Fig. 2.

Figs. 4, 5 and 6, show further successive steps in the formation of said tubular structure.

Fig. 7 is a perspective showing a bag formed from the tubular structure above referred to.

Fig. 8 is a section illustrating an alternative construction of the multiple web.

Fig. 9 illustrates an expedient method for making the multiple web of Fig. 2.

Fig. 10 is a diagrammatic side elevation of a machine for carrying out the steps of Figs. 2 to 6 inclusive, and forming the bag of Fig. 7.

Fig. 10a, is a continuation of the machine shown in Fig. 10.

Fig. 10b illustrates an alternative construction or arrangement of the machine of Fig. 10. As here shown the formation of the multiple ply web is accomplished as a continuous operation in conjunction with formation of the bag.

Fig. 11 is an elevation taken from the left side of Fig. 10a showing means for making a bottom seal in the tubular structure, to form therefrom the bag of Fig. 7.

Fig. 12 is a perspective illustrating a novel member employed in my machine.

Fig. 13 is a fragmentary perspective taken along the line 13—13 of Fig. 10 illustrating the function of the member shown in Fig. 12.

Fig. 14 is a section through an alternative multiple web, the central cross-hatched portion representing the areas of the two plies which are united, adapted to be formed into an alternative bag construction.

Figs. 15 to 18 illustrate consecutively a series of steps for forming the multiple ply web of Fig. 14 into a tubular structure, and Fig. 19 illustrates a bag made of a segment of the tubular structure shown in Fig. 18.

Referring now to Fig. 2. The two plies of material are shown. For convenience the ply which is to form the interior of the completed tube or bag will be hereafter called the inner ply, while the ply which is to form the exterior of the finished tube or bag will hereafter be called the outer ply. In the drawing the inner ply is marked "I" and the outer ply "O".

The inner ply may be any packaging material the surface of which at least is heat-sealable, such as a rubber hydrochloride sheeting sold under the trade-name of "Pliofilm", for example. The outer ply may be any flexible material, such as paper or the like.

As shown in Fig. 2, the two plies have been brought together and secured to each other, over the surface areas as represented by the cross-hatched portion A. It will be noted that the margins of the plies along one side have been left free and unsecured to each other, the marginal edge 20 of the ply I being unsecured to the corresponding marginal edge 21 of the ply O.

Fig. 3 illustrates the first step in bringing the combined ply shown in Fig. 2 into tubular form, around a forming plate 36, which may be made of metal or other rigid substance, as is customary and well known in the bag-making art. It will be observed that in folding over the side of the webs having the unsecured marginal edges, the inner marginal edge 20 has been folded down upon the forming plate, but that the outer marginal edge 21 has been retained in raised or upright position.

As shown in Fig. 4 the next step in the successive stage of folding consists in bringing the opposite margin 24 of the combined plies down upon the inner marginal edge 20. As will be apparent, this serves to bring one marginal surface of the inner play into position overlying the other marginal surface 20 of the inner ply. If desired, heat may be applied thereupon, to the outer ply of the overlapped portions, to penetrate through the outer ply and to cause the superposed margins of the inner ply to become sealed to each other thereby, by means, for example, as disclosed in my U. S. Patent No. 2,114,625. However, I prefer to effect this heat seal after the next step, which is shown in Fig. 5.

As shown in Fig. 5, the marginal edge 21 of the outer ply has now been folded down to overlie the previously folded opposite margin, and it can be seen that this folding brings the two opposite marginal portions 21 and 24 of the outer ply into superposed position. Prior to this final folding step, adhesive 25 (in Fig. 4) has preferably been introduced between the meeting surfaces of the marginal edges of the outer ply just referred to, so that upon folding, adhesion may be effected therebetween. It is at this stage, i. e., after the tube-forming operation has been completed, I prefer to introduce heat as illustrated in Fig. 6, to effect a heat-seal 26 between the superposed margins of the inner ply, the heat striking through the over-lying outer ply to effect said seal. Numeral 50 indicates the heat sealing member.

The tubular structure thus formed comprises an interior of heat-sealable material, of an integral nature, since no part of the outer ply is interposed therebetween, and at the same time the inner ply is reinforced and supported throughout by the outer ply. As seen in Fig. 7 the tubular structure thus formed may thereafter be severed into unit length sections, and an end of said sections sealed to make the bottom closure 27 by the application of heat to a restricted area transverse the section, or the transverse seams may be made prior to severing into unit lengths, or by other closing means.

Fig. 10 illustrates diagrammatically one machine for carrying out my tube-forming method as above described. To simplify the description the same designations will be used as the figures just described.

Referring first to Fig. 10b, a web of the inner ply I is drawn from a supply roll 28, and a web of the outer ply O is drawn from a supply 29, by the draw rolls 30 and 31. The under surface of the ply I passes over a glue-applying roll 32, which runs in the glue reservoir 33, there being a doctor blade 34, to control the thickness of the glue film applied. Referring to Fig. 2 it should be noted that the glue wheel 32 is somewhat less in width than the web I, leaving the marginal edge 20 uncoated.

The two plies come together as they pass over the roller 35. 36 is a forming plate which may be of conventional construction, and the united plies are started into tubular form about the forming plate by the customary guides and rollers as will be presently mentioned. At 37 is illustrated a narrow glue wheel receiving glue from a reservoir 38, the wheel 37 applying a narrow stripe of adhesive 25 (in Fig. 2) to the under side of the united marginal edge 24 of the outer ply.

Instead of uniting the two plies as they are drawn into the tube-forming machine, I may unite them (except for a marginal edge), as a separate previous operation, and as illustrated in Fig. 10, place the combined roll 39 on the tube-forming machine. For example, referring to Fig. 9, I may take two wide rolls or webs Ia and Oa, each web being equal in width to three times the width of the plies desired for a particular tube, and rewind and unite these wide rolls or webs in an operation wherein unsecured portions 40, 41 and 42 are left at spaced intervals, and as the rolls are rewound, slit the material along the lines 40a and 41a, into three narrower rolls, each of said narrower rolls being of the desired width for the tube, and each of said rolls having thereby one unsecured lateral marginal edge.

Referring again to Fig. 10, I prefer, when using the previously combined webs, to incorporate in my machine a finger 44 (see Fig. 2a) which insures initial separation of the margins 20 and 21. As the combined web passes the breaker rolls 45 it is drawn into tubular formation about the forming plate 36 by a series of rollers 47, and swords 48 as is common practice in bag manufacture.

49 represents a special twisted guide, which serves to separate the free marginal edges of the plies, retaining the marginal edge 21 of the outer ply in lifted or raised position, as the marginal edge 20 of the inner ply is brought into folded position over the forming plate, as shown in Figs. 3 and 13.

After the marginal edge 20 of the inner ply has been brought down over the forming plate as illustrated, the opposite secured edge 24 of the combined plies is guided into folded down position to overlie the said marginal edge 20 as shown. Thereafter as also illustrated, twisted guide member 49 terminates, releasing the edge 21, which thereafter is folded down to overlie the outer ply of the secured marginal edge 24, which marginal edge 24 previously had a stripe of adhesive placed thereon by the glue wheel 37.

50 represents a strip heater, positioned as illustrated to overlie the area wherein the marginal edge 20 is overlapped by the inner ply of the secured marginal edge 24, the heat passing through the outer ply to cause a fusion or heat seal between the overlapped inner plies, as before explained in reference to Fig. 6. As the tubular structure thus formed passes between the draw rolls 51 and 52, pressure is applied to secure the heat seal between the marginal edges of the inner ply, and also to secure adhesion between the overlapped marginal edges of the outer ply. The tubular structure thus secured may be severed into unit lengths by a fly-knife 53 as shown, the unit length tubular structures may thereupon be stacked and taken to another machine for bottom closure, or referring to Figs. 10a and 11, conveyed further and the bottom closed as part of the same series of operations, by transverse heat applied adjacent one end of the tube sections as by the heat-sealing member 54, while the bag travels on conveyor 55, or by other means.

In Fig. 10b the adhesive is shown as applied to a surface of the inner ply, and it is apparent that if desired the adhesive might be applied to a surface of the outer ply, before the plies are brought together instead. Also as indicated in Fig. 8, the plies do not need to be solidly united over their combined area, but may be united by stripes 43, or dots of adhesive, or the plies may be joined by the use of heat as disclosed in my U. S. Patent No. 2,114,625. However, one or both of the plies may have surface portions which are to be joined coated with a substance which can be reactivated by heat, and the plies may be joined as they are brought together by the use of heat or heat and pressure, except for one marginal edge thereof which is left free and unsecured. I prefer to have one marginal edge secured, and the other marginal edge of course being unsecured, and the balance of the ply areas may be secured sufficiently to facilitate the tube-forming operation.

In the alternate construction shown in Fig. 14, the inner ply I is of greater width than the outer ply O. The cross-hatched portion 56 represents the surface of the two plies that are secured together, and again it is to be noted that the marginal edge 58 of ply O is left unsecured to the inner ply I.

Since the sequence of operations to bring these plies into desired tubular form is similar to the steps described previously herein, it is not thought necessary to repeat in full detail, as it will be understood that in performing the folding operations described in the figures which follow, a forming plate, guides, etc., are used just as before.

Fig. 15 shows the combined plies of Fig. 14 partially folded, the marginal edge 59 being folded in, while the marginal edge 58 is retained in partially folded position.

Fig. 16 shows the next folding step, the opposite marginal edges of the combined plies having been folded in as shown. It will be noted there is a considerable overlapping of the marginal portions 59 and 60 of the inner ply.

Fig. 17 illustrated the next, and last tube-folding step, the marginal edge 58 having been folded down as shown.

Fig. 18 illustrates the application of two heat seams 61 and 62 to the folded tube, these seams serving to retain the folded plies in tubular form. It will be understood that, as in the first series of drawings, these heat seams are formed while the tube is still around the forming plate 36a, so that the superposed plies at the point of application of the heat are joined together by the action of the heat, without causing the opposite walls of the tubular structure to become stuck together. If the nature of the material used for the inner ply is such that it will not adhere to the outer ply by the effect of heat alone, it is apparent that before folding down the marginal edge 58 as shown in Fig. 17, adhesive may be applied to its undersurface, or to the corresponding portion of the inner ply, to secure the edge 58 in folded condition by adhesion.

In Fig. 19 is shown a diagrammatical illustration of a unit length of the tubular structure shown in Fig. 18, after one end 63 of same has been sealed, contents 64 inserted, and then the remaining end 65 sealed.

In this illustration the inner ply is composed of a heat-sealable material of a transparent nature such as rubber hydrochloride sheeting, and the outer ply is of paper or the like. As shown in Fig. 19, this construction thereby permits effective visibility of the contents, and yet, the bag is of double thickness all around—that is there are two plies of the transparent material forming the window section, and one ply of transparent material and one ply of paper, forming the balance of the structure.

Furthermore, it should be noted that the interior of the bag, or tube, is of an integral nature, i. e., completely formed by heat-fusion of the inner ply, with no interposition of the outer ply to break its unity. Thus, I have achieved both mechanical strength, the maximum of protective characteristics, and visibility in my structure.

It is apparent that this invention can also be carried out by severing the joined plies into unit bag length sections before forming the unit lengths into tubular form, and this and other variations can be made without departing from the spirit or scope of the invention as disclosed, and having thus described my invention what I claim as new and novel and desire to secure by Letters Patent is as follows:

1. A method of making multiple ply tubes wherein the inner ply at least is of heat-sealable material, which comprises continuously moving said plies along and securing them together with one marginal edge of the outer ply at least being unsecured to the superposed corresponding portion of the inner ply, continuously separating said unsecured edge and bringing said plies into tubular form by infolding said inner ply portion, then folding an opposite edge of combined plies in to overlie said previously folded portion and thereafter folding in said first mentioned edge of the outer ply, adhesive having been introduced between under-surface of said edge and the corresponding surface it overlies when folded in.

2. A method of making multiple ply tubes wherein the inner ply at least is of heat-sealable material, which comprises continuously moving said plies along and securing them together with one marginal edge of the outer ply at least being unsecured to the superposed corresponding portion of the inner ply, continuously separating said unsecured edge and bringing said plies into tubular form by folding down the sides of the material having the unsecured edge, said unsecured marginal edges having been separated, and thereafter folding in the opposite edge of the combined plies to overlie said edge of the inner ply, and thereafter folding in said first mentioned edge of the outer ply, applying heat thereafter to fuse overlying surfaces of the inner ply.

3. A method of making multiple ply tubes wherein the inner ply at least is of heat-sealable material, which comprises moving said plies along and securing them together with one marginal edge of the outer ply at least being unsecured to the corresponding edge of the inner ply, separating said plies at said unsecured edge as they are moved along and bringing said plies into tubular form by first folding down that side of the web material on which the edges are unconnected, the unsecured edge of the outer ply having been separated from the unsecured edge of the inner ply, and thereafter folding down the opposite side of the material whereby the combined edge is brought into position overlying said free edge of the inner ply, thereafter folding in the free edge of the outer ply, applying heat to fuse overlying surfaces of the inner ply severing to unit lengths and securing thereafter an end of said unit lengths by the transverse application of heat.

4. A method of making tubes comprising moving along and uniting two webs except at spaced intervals in the direction of the motion, severing said combined webs in unit widths wherein said unsecured portion forms one marginal edge of each of said widths, and thereafter folding in the side having said unsecured marginal edge, separating said unsecured edge and interleaving the opposite secured edge therebetween.

5. A method of making window bags from an inner ply of transparent material and an outer ply of other material, consisting in bringing into superposed position a web of transparent material substantially greater in width than said other material, uniting said webs with one marginal edge of outer material unsecured to the transparent material, folding the plies into tubular form by successive steps wherein the extending portion of the transparent material adjacent the unsecured outer ply edge is folded under the opposite extending portion of the transparent material, and thereafter folding down the unsecured marginal edge of the outer ply thereon.

ROBERT MORRIS BERGSTEIN.